Oct. 3, 1950  K. REINER  2,524,176
NUT RETAINER ASSEMBLY
Filed Nov. 23, 1945
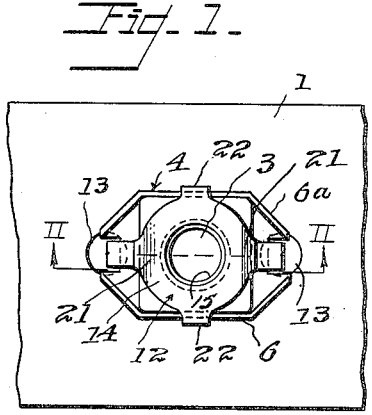
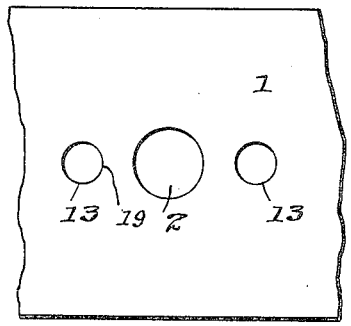
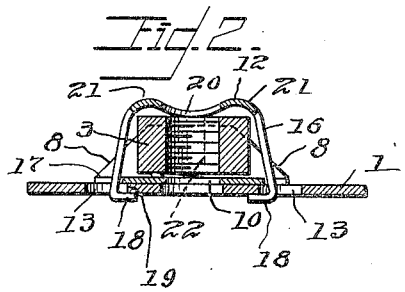
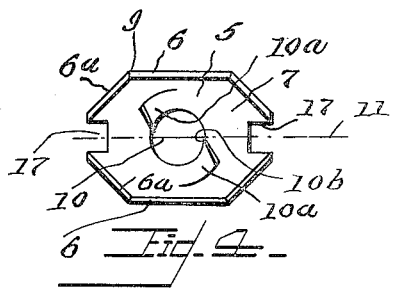
Inventor:
Kenneth Reiner
By Francis D. Ammen
Atty.

Patented Oct. 3, 1950

2,524,176

UNITED STATES PATENT OFFICE 2,524,176

NUT RETAINER ASSEMBLY

Kenneth Reiner, Los Angeles, Calif.

Application November 23, 1945, Serial No. 630,171

7 Claims. (Cl. 85—32)

This invention relates to a retainer assembly such as is employed in bolting up structures of any kind, for holding a nut in place on a plate or flange through which a bolt is passed, and screwed into the nut. These assemblies are used largely to facilitate placing fastening bolts in position and to avoid the necessity for the nut being held by a helper against rotation by a wrench or other means.

One of the objects of the invention is to provide retainer means for engaging the sides of the nut to prevent it from rotating, and to provide the same with simple means for holding such means in place on the plate or other part through which the attaching bolt is to pass.

A further object of the invention is to construct means for holding the nut and this retainer or shoe in place, that is of such a character as to enable it to be snapped quickly into place, and without the necessity for employing any special tools for accomplishing this.

Another object of the invention is to provide an assembly structure for the purpose stated, which, while it will hold the opening in the nut substantially centered over the opening in the plate or "work," nevertheless the nut will be held in such a way that it will be capable of a shifting movement sufficient to enable it to align with the bolt that is to be secured in the nut.

Another object of the invention is to provide a construction that will attain a lock-washer effect for the nut to prevent the bolt from working loose after it has been secured in the assembly.

Further objects of the invention will appear hereinafter.

The invention consists in the novel parts and combinations of parts to be described hereinafter, all of which contribute to produce an efficient nut retainer assembly.

A preferred embodiment of the invention is described in the following specification, while the broad scope of the invention is pointed out in the appended claims.

In the drawing:

Figure 1 is a plan of a short piece of plate broken away and showing a retainer assembly employing this invention mounted on the plate.

Figure 2 is a vertical section taken through the retainer assembly about on the line II—II of Figure 1.

Figure 3 is a plan of the plate illustrated in Figure 1 and showing the openings provided therein, before the retainer assembly is applied to the plate.

Figure 4 is a plan of the retainer or shoe which forms a seat for the nut to prevent its rotation.

Referring more particularly to the parts, 1 indicates the work-piece that may be a member or part of any size or shape. For example, this member is indicated in the drawing as a narrow plate broken away at its ends; and in Figure 3 this plate is shown before the nut retainer assembly has been applied thereto.

A work-piece such as this plate 1 is usually provided at a plurality of points with openings such as the opening 2, for receiving spaced bolts, and through which the bolts are applied to their nuts, such as the nut 3. The nut must be held in place and substantially centered over its corresponding opening 2.

This nut 3 is received in a retainer or shoe 4 shown in detail in Figure 4, that is preferably formed of light, thin metal, including a plate-form base portion 5 with integral side flanges 6 that in the present instance extend parallel with each other and project upwardly or outwardly from the upper face of the base plate 5.

The plate 5 is preferably formed with tapered extensions 7, and the flange 6 has extensions 6a along the edges of these tapered extensions. But at these ends the upper edge 8 of each flange 6a is inclined, as illustrated in Figure 2. At the dihedral angles 9 formed between the end flanges 6a and the side flanges 6, the corners of the nut are located when the nut is put in place. The center of the shoe 4 has an opening 10 to fit over the bolt that is received in the nut 3.

After the nut is in position it is held there by a cap member 12 which is provided with means for enabling it to be snapped into position on the plate 1 in a manner that will be presently described.

This cap member 12 preferably has a substantially annular body 14 having a central opening 15, sufficiently large to clear the end of the bolt that is screwed into the nut 3 from below, and at two diametrically opposite points the annular body 4 is provided with downwardly extending spring fingers 16. These fingers lie in two sockets, or guide notches 17 at the ends of the base plate 5 when they are shoved downwardly through the eyes 13. The lower ends of the fingers terminate in inwardly projecting hooks 18. When the cap member is being put in place, one of the hooks 18 is inserted in one of the eyes or sockets 13 and hooked onto its edge 19. Then the cap member is pressed down at the opposite side so that the other hook enters its socket 13 and snaps under the edge 19 of its eye 13. After the hooks pass below the inner, or bottom, face of the plate 1, their resiliency causes them to move toward each other, that is to say, they will snap under the edges of the eyes 13.

In order to increase the resilient or "snap-action" of these fingers 16, I prefer to construct the annular body 14 so that it will have a concavo-convex form. This is illustrated in Figure 2, which shows the middle portion of the annular body 14 as curved downwardly, and presenting a convex cylindrical face on its underside that seats against the upper face of the nut. Beyond this middle portion, and adjacent the roots of the spring fingers 16, the material of the cap is bent upwardly in a reversely formed concavo-convex cylindrical curve substantially as shown. In this way the middle portion of the body 14 of the cap member is made to present a downwardly curved middle bow 20 which merges into two oppositely bent side bows 21. These side bows are preferably bent on cylindrical arcs. In this way, that is to say, by reason of these concavo-convex curved portions, the hooks 18 can readily be deflected outwardly past the edges 19 of the base plate 5, and after they have snapped into place they will exert considerable spring action to hold them in place in the eyes 13. And after the hooks lodge themselves in the eyes 13, the annular body 14 of the cap member 12 will press yieldingly down on the upper face of the nut and hold it securely in place, though permitting a limited amount of shifting movement of the nut in a transverse plane when the threaded end of the bolt is screwed into it.

If desired, the sides of the annular body 14 of the cap member 12 may be provided with two integral downwardly bent tongues 22 that engage the adjacent side faces of the nut, or the outer sides of the shoe. These tongues 22 cooperate in saddling the cap member 12 on the nut and assist in holding the cap member in place. However, they do not interfere with the lateral shifting movement of the nut at right angles to the axis 11, as may be necessary to align it with the bolt when it is being screwed into the threaded opening of the nut.

In accordance with my invention, when the spring fingers 16 move away from each other, or toward each other when they snap into position under the plate 1, they are guided by the base portion 5 of the shoe. This function is preferably accomplished by providing the guide notches 17 which are located on the axis line 11 that is substantially parallel to the side flanges 6, and located midway between the same.

The shoe 4 can shift on the plate 1 in any direction, by reason of the fact that the lower ends of the fingers have clearance in every direction in the eyes or sockets 13.

All bolts have a tendency to work loose from the nuts. This may be due to vibration and temperature changes. I provide means on one of the parts of the assembly for engaging a bolt head or a nut to resist a rotation that would loosen it. In order to do this, I prefer to form the edge of the opening 10 with one or more spurs 10a (see Fig. 4). They are struck from the material of the plate by means of dies, and their tips 10b press resiliently up against the lower side of the nut. When the bolt is tightened up they become compressed and cooperate with the spring bows 20 and 21 to hold the nut and bolt against relative rotation.

Many other embodiments of the invention may be resorted to without departing from the spirit of the invention.

I claim as my invention:

1. In a construction of the kind described, the combination of a work-piece having an opening through which a fastening bolt is to be passed, said work-piece having eyes disposed adjacent to the said opening, a nut retainer for a standard nut having flat side faces, said retainer having a base portion to seat on said work-piece, and having an opening substantially registering with the opening in said piece, said retainer having means for engaging the side of the nut the rotation of which is to be prevented, and having oppositely disposed extensions located further apart than the width of the nut measured across its flats; and a cap-member for seating on the upper face of the nut, and having resilient fingers extended through said eyes and engaging with the inner face of said work-piece at the edges of said eyes, said base portion having means for engaging and guiding said fingers for movement toward or from each other when the same are thrust through said eyes, all of said parts cooperating to permit the nut to shift so as to bring its opening into alignment with the bolt when inserted.

2. In a construction of the kind described, the combination of a work-piece having an opening through which a fastening bolt is to be passed, said work-piece having eyes disposed adjacent to the said opening, a nut-retainer having a base portion to seat on said work-piece, and having an opening substantially registering with the opening in the work-piece, a standard flat-sided nut lying in said retainer, said retainer having means for engaging a flat side of the nut to prevent its rotation, said base portion having extensions projecting beyond opposite sides of the nut; and a cap-member seating on the upper face of the nut, and having fingers extending down through said eyes and capable of snapping resiliently into engagement with the inner face of said work-piece at the edges of said eyes, said base-portion having means for engaging and guiding said fingers for movement toward or from each other when the same are thrust through said eyes; all of said parts cooperating to permit the nut to shift so as to bring its opening into alignment with the bolt when inserted.

3. In a snap-action nut retainer assembly of the kind described, for application to a work-piece having a bolt opening, and with eyes therein disposed on opposite sides of said opening, the combination of a shoe having a base portion with an opening seated over the first named opening, and having side flanges operating to engage the sides of the nut to prevent rotation thereof, a nut seating on said base portion between said flanges and held against rotation thereby, said shoe having extensions projecting beyond the sides of the nut on a line substantially midway between the flanges; and a cap-member seating on the outer face of the nut and having spring fingers extending down through said eyes and snapped under the same, for securing the shoe to the work-piece, said extensions having notches at their ends for engaging and guiding said spring fingers when the same are thrust through said eyes.

4. In a snap-action nut retainer assembly of the kind described for application to a work-piece having a bolt opening, and with eyes therein disposed on opposite sides of said opening, the combination of a shoe having a base portion with an opening to seat over the first named opening, and having side flanges operating to engage the sides of the nut to prevent rotation thereof, a nut seating on said base portion between said flanges, said shoe having extensions projecting beyond the sides of the nut on a line substantially midway between the flanges; and a cap-member seating on the outer face of the nut and having spring fingers extending down through said eyes and snapped under the same, for securing the shoe to the work-piece, said extensions having means for engaging and guiding said spring fingers when the same are thrust through said eyes, said fingers having inwardly projecting hooks on the ends thereof the sides whereof engage the under side of the work-piece at the edges of said eyes to spread the fingers and permit the same to pass into the eyes and snap under the edges thereof.

5. A snap-action nut retainer assembly of the kind described, according to claim 3, in which the cap-member has an annular body where it seats on the outer face of the nut, said annular body having concavo-convex curves giving resiliency to said fingers.

6. A snap-action nut retainer assembly of the kind described, according to claim 4, in which the cap-member has an annular body with a convexly formed middle portion to seat on the outer face of the nut, with concavo-convex curved portions connecting said annular body to said fingers.

7. In a nut retainer assembly, for retaining a flat-sided nut, the combination of a plate-form shoe having a base portion on which the bottom face of the nut rests, said base having integral upwardly projecting side flanges the inner sides whereof engage the sides of the nut, said flanges presenting spaced dihedral angles, a nut lying in the shoe with its angular portions received in said dihedral angles, said base portion having extensions projecting beyond the sides of the nut, with notches in their ends, and a cap-member seating on the outer end of the nut and having spring fingers received in said notches.

KENNETH REINER.

REFERENCES CITED

The following references are of record in the file of this patent:

UNITED STATES PATENTS

| Number | Name | Date |
| --- | --- | --- |
| 99,232 | Pratt | Jan. 25, 1870 |
| 443,911 | Fletcher | Dec. 30, 1890 |
| 957,504 | Frenot | May 10, 1910 |
| 1,706,820 | Reck | Mar. 26, 1929 |
| 1,768,505 | Carr | June 4, 1930 |
| 1,800,176 | Carr | Apr. 7, 1931 |
| 2,303,148 | Tinnerman | Nov. 24, 1942 |
| 2,363,006 | Klaus | Nov. 21, 1944 |

FOREIGN PATENTS

| Number | Country | Date |
| --- | --- | --- |
| 460,832 | Germany | Sept. 19, 1929 |